United States Patent [19]

Welburn

[11] Patent Number: 4,551,708
[45] Date of Patent: Nov. 5, 1985

[54] REACTANCE-COMMUTATED HIGH RESOLUTION SERVO MOTOR SYSTEM

[75] Inventor: Ross D. Welburn, Santa Rosa, Calif.

[73] Assignee: Motornetics Corporation, Santa Rosa, Calif.

[21] Appl. No.: 556,083

[22] Filed: Nov. 29, 1983

Related U.S. Application Data

[63] Continuation-in-part of Ser. No. 385,034, Jun. 4, 1982, Pat. No. 4,501,980, and Ser. No. 531,292, Sep. 12, 1983, Pat. No. 4,458,168.

[51] Int. Cl.$^4$ .............................................. H03K 13/02
[52] U.S. Cl. ................................ 340/347 SY; 318/661
[58] Field of Search ................... 318/659, 660, 661; 336/120, 121, 122, 123; 340/347 SY

[56] References Cited

U.S. PATENT DOCUMENTS

| | | |
|---|---|---|
| 2,627,040 | 1/1953 | Hansen . |
| 3,162,796 | 12/1964 | Schreiber et al. . |
| 3,292,065 | 12/1966 | Frederickson . |
| 3,396,321 | 8/1968 | Pellecchia ........................ 318/660 |
| 3,438,026 | 4/1969 | Prill et al. ..................... 340/347 SY |
| 3,535,604 | 10/1970 | Madsen et al. ..................... 318/696 |
| 3,564,536 | 2/1971 | Hyatt ........................... 340/347 SY |
| 3,629,626 | 12/1971 | Abbott . |
| 3,676,659 | 7/1972 | Asmussen ..................... 340/347 SY |
| 3,705,343 | 12/1972 | Ringland et al. .................. 318/659 |
| 3,839,665 | 10/1974 | Gabor ............................. 318/660 |
| 3,867,676 | 2/1975 | Chai et al. . |
| 4,029,977 | 6/1977 | Chai et al. . |
| 4,035,680 | 7/1977 | Maeder . |
| 4,070,592 | 1/1978 | Snowdon . |
| 4,085,355 | 4/1978 | Fradella ........................... 318/721 |
| 4,286,180 | 8/1981 | Langley . |
| 4,288,709 | 9/1981 | Matthias et al. . |
| 4,358,722 | 11/1982 | Iwakane et al. ................... 318/661 |

FOREIGN PATENT DOCUMENTS

| | | |
|---|---|---|
| 1556404 | 11/1979 | Fed. Rep. of Germany . |
| 2822830 | 11/1979 | Fed. Rep. of Germany . |
| 1469257 | 1/1966 | France . |
| 48-5029211 | 7/1973 | Japan . |
| 48-1393586 | 7/1973 | Japan . |

OTHER PUBLICATIONS

IBM Technical Disclosure Bulletin, Linear Incremental Motor, Thompson, vol. 6, No. 9, 2/64.

Primary Examiner—David Smith, Jr.
Attorney, Agent, or Firm—Philip M. Shaw, Jr.

[57] ABSTRACT

A synchro/resolver, preferably for use in combination with an identically constructed servo motor, having an annular stator with circumferentially arranged poles, each with its own coil winding thereon, and with the coils being connected in phases, an annular rotor positioned adjacent to the stator so that a change in rotational position of the rotor changes the inductance of the coil windings as a function of the rotational position of the rotor, and a detecting circuit for sensing alternating current flowing in each coil phase and for amplifying the differences between the currents in each phase to produce a rotational position output signal for commutating the motor.

7 Claims, 9 Drawing Figures

CONVERTING INDUCTANCE SYNCHRO SIGNALS TO STANDARD SYNCHRO FORMAT

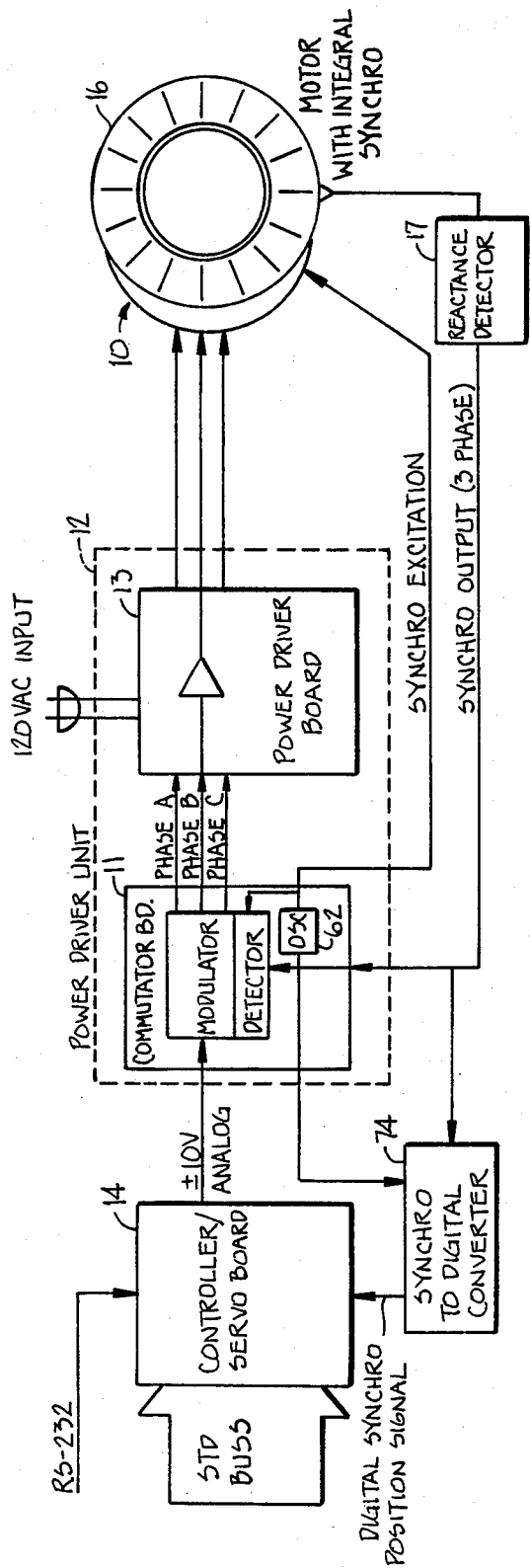
FIG._1.

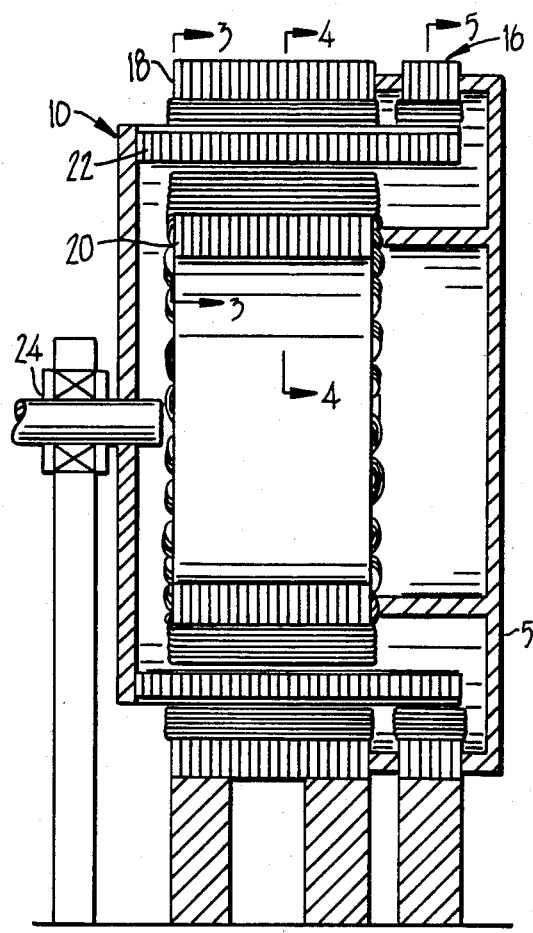
FIG._2.
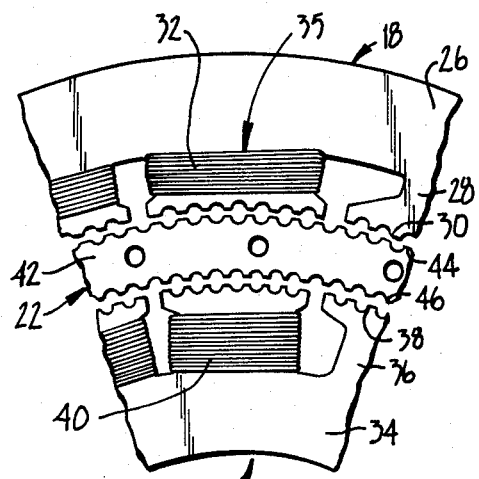
FIG._3.
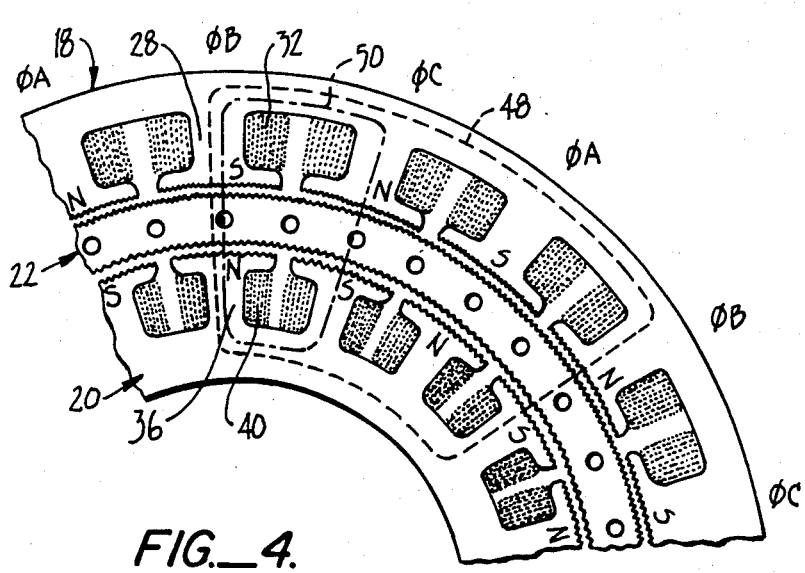
FIG._4.

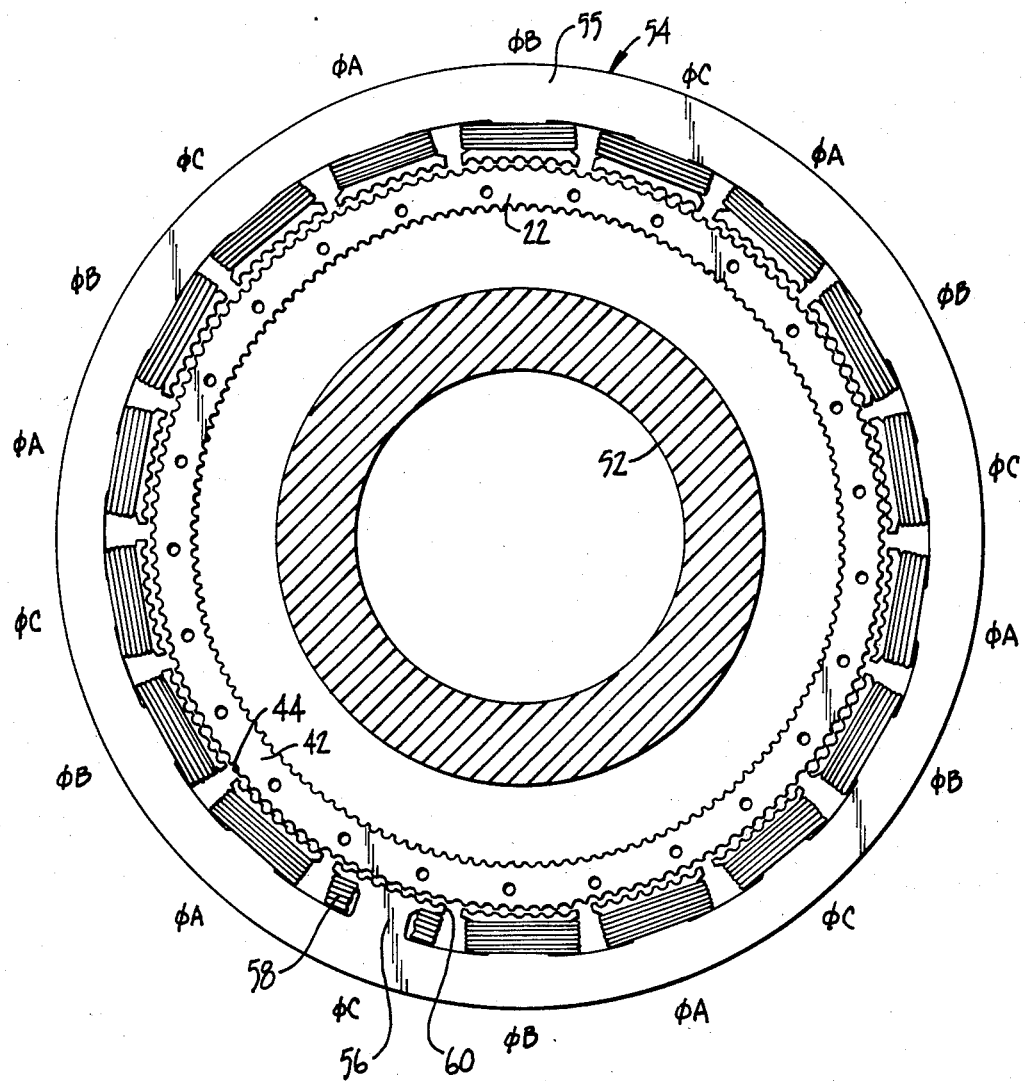
FIG._5.

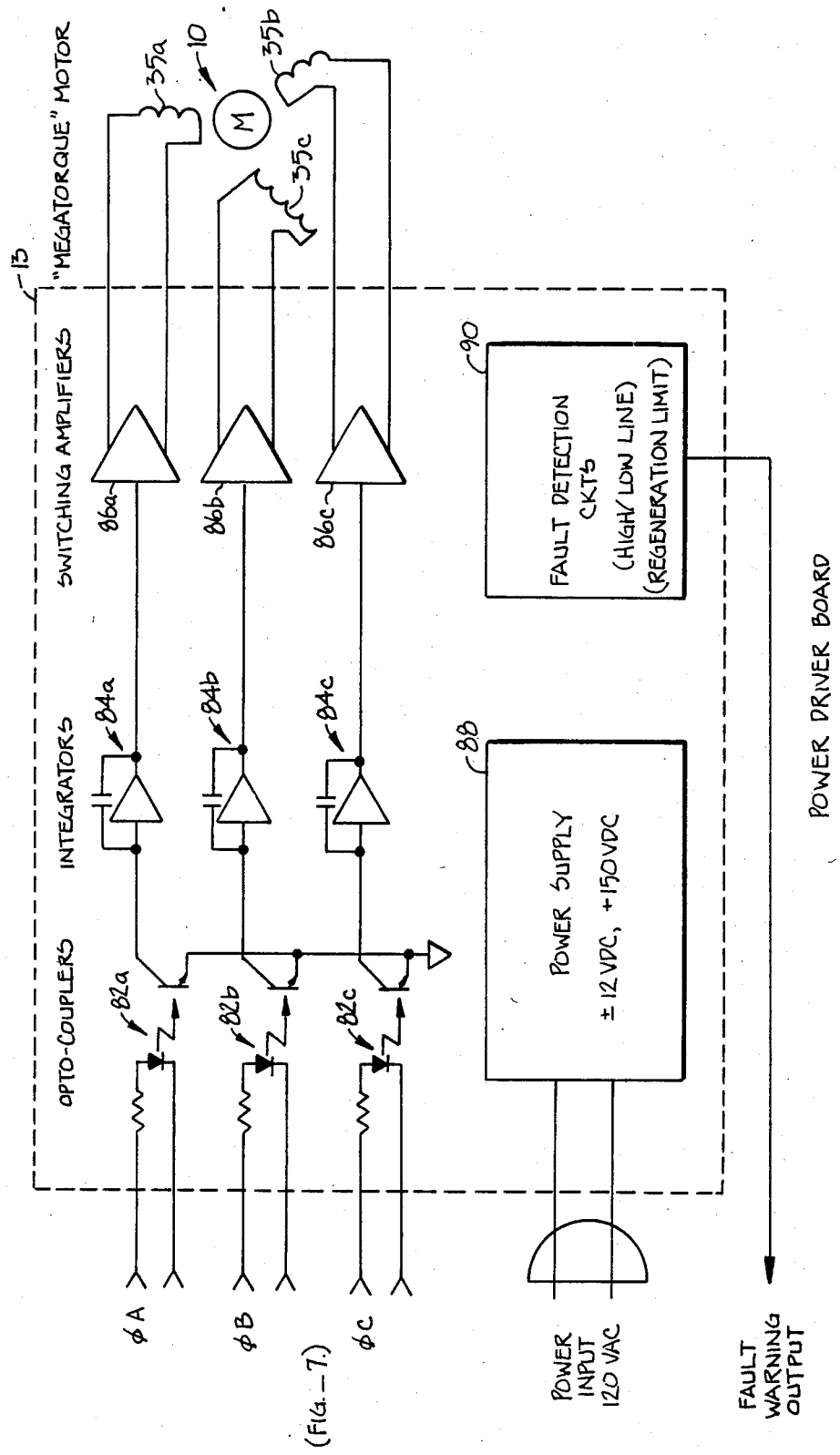
FIG._6.

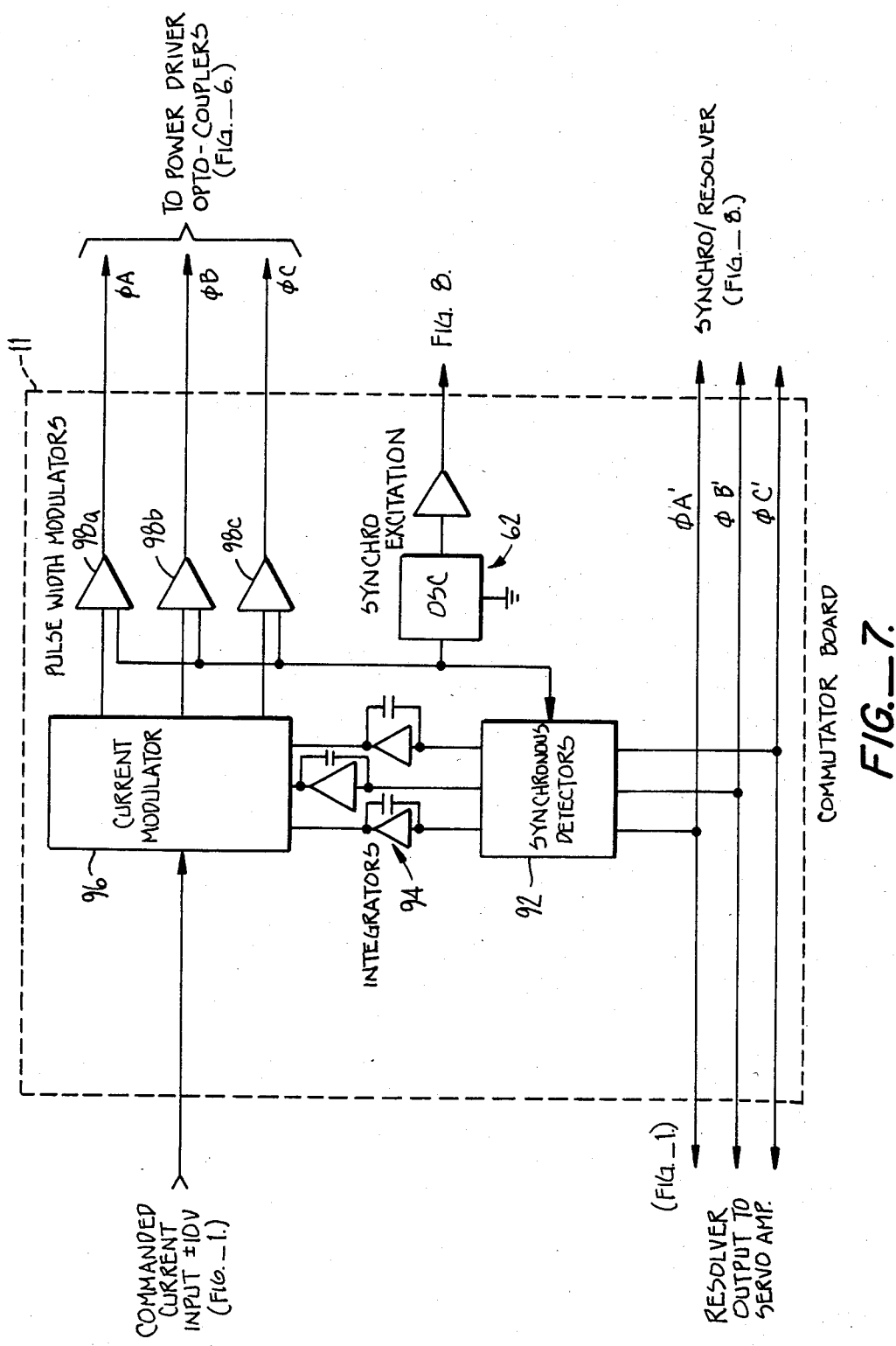

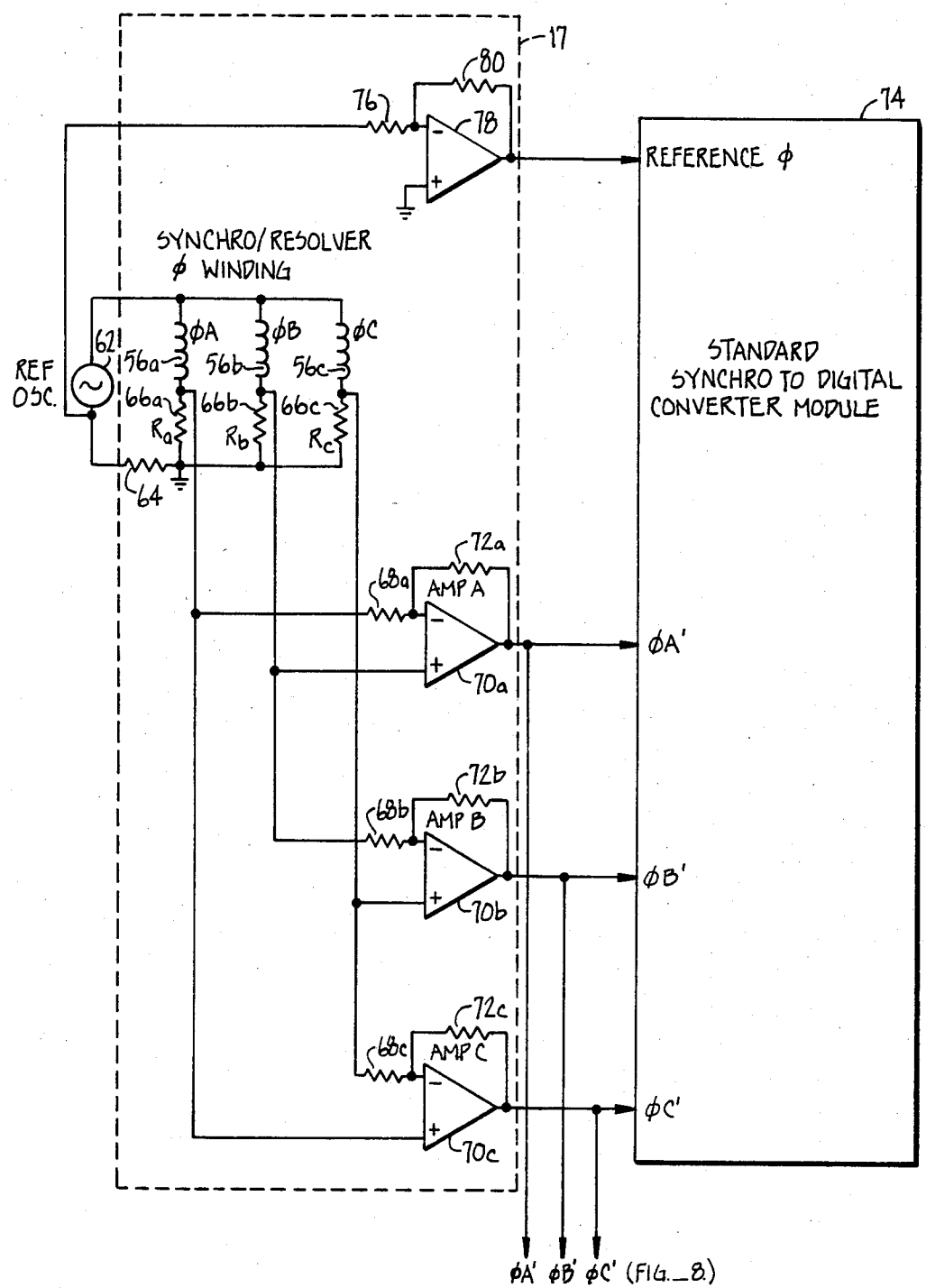
CONVERTING INDUCTANCE SYNCHRO
SIGNALS TO STANDARD SYNCHRO FORMAT
FIG._8.

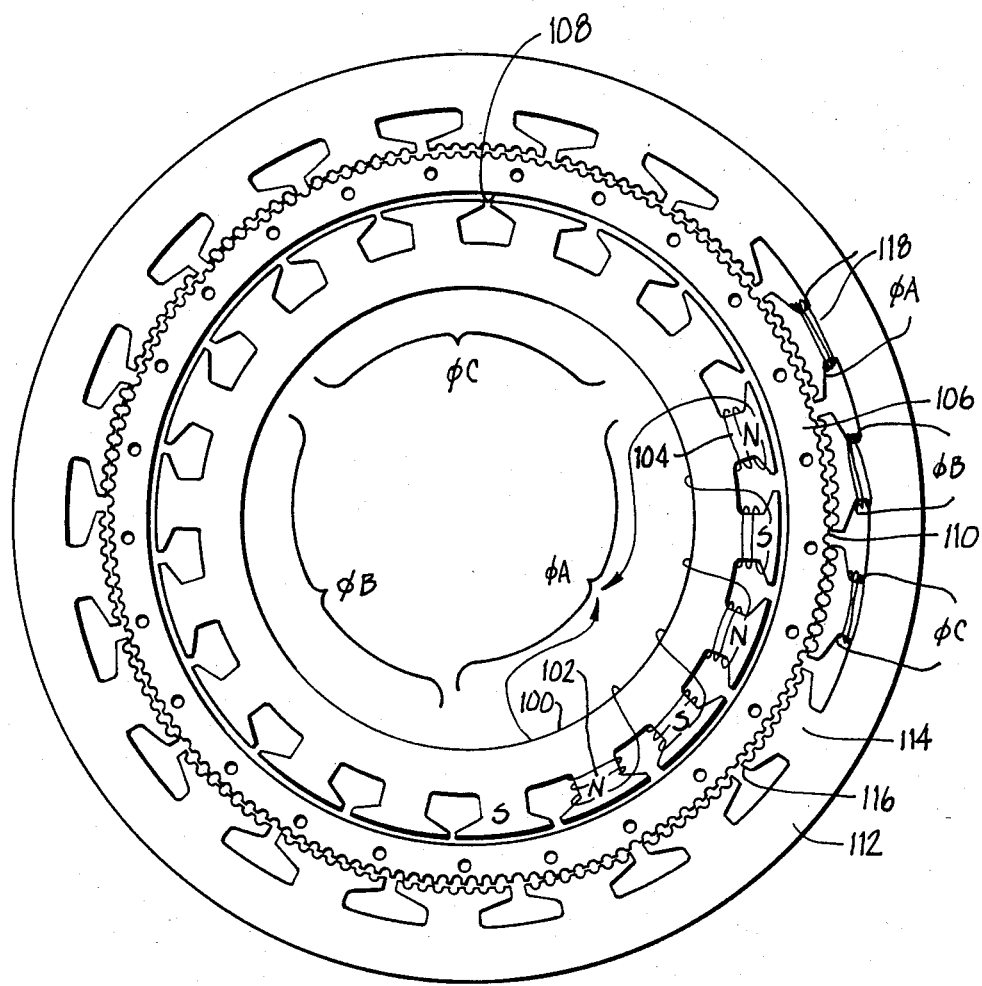
FIG._9.

REACTANCE-COMMUTATED HIGH RESOLUTION SERVO MOTOR SYSTEM

CROSS-REFERENCE TO RELATED APPLICATIONS

This application is a continuation-in-part of the applicant's co-pending applications Ser. No. 385,034, filed June 4, 1982, now U.S. Pat. No. 4,501,980 and entitled HIGH TORQUE ROBOT MOTOR and Ser. No. 531,292, filed Sept. 12, 1983, now U.S. Pat. No. 4,458,168 and entitled TOOTHED RELUCTANCE SYNCHRO/RESOLVER.

TECHNICAL FIELD

The present invention relates generally to a servo motor system and, more particularly, to a brushless DC reactance-commutated servo motor system.

BACKGROUND ART

Direct drive servo systems are finding wide application in robotics type systems. A servo system using a direct drive motor simplifies the mechanical system by eliminating backlash, increasing reliability and decreasing maintenance problems caused by gears, belts and couplings. Many conventional servo motor systems, however, include a number of operating problems as well as unnecessary manufacturing costs and have undesirable weight and space requirements.

The torque of a conventional reluctance type motor, for example, is proportional to the square of the flux density. This makes the torque output of the motor non-linear with respect to the input signal, thereby increasing the complexity of the circuitry required to process the error signal. Still another problem is that other servo motors require bipolar currents and this increases both the complexity of the driving amplifiers and the power supplies. Some require, for example, a full bridge rectification system which suffers from reliability problems through cross conduction at high power levels because of variable transistor delays and reversed biasing problems. Often, such power supplies require a large power transformer which adds to the size, weight and cost of the servo system. Still other common problems suffered by prior art servo systems are the effect of ripple current in the motor and AC line isolation.

Prior art position sensors coupled to the motor, such as a synchro/resolver, require both primary and secondary windings and have mechanical features, such as slip rings, which increase maintenance and reliability problems. Also, prior art synchro/resolvers used in servo systems do not have as high a resolution or as accurate as is often desired in digital direct drive servo positioning systems. In some cases, the output signal of the synchro/resolver encounters interference with the motor windings.

Still another problem of prior art servo systems is that the commutation of the motor is not proportional. This is to say that the amount of power which must be supplied to the motor as the load increases is not uniform for all positions of the motor shaft. Thus, the requirements of the motor input signal by way of waveform shape, duration and phase vary depending on the shaft position of the rotor of the motor. Prior art resolvers do not provide any compensation for this problem.

DISCLOSURE OF THE INVENTION

The above and other disadvantages of prior art synchro/resolvers and servo motor systems are overcome by the present invention of the combination of a multiphase, servo motor of the type having an output shaft, a positioning sensor connected to the motor for generating a position signal representative of the rotational position of the output shaft, and driver means for driving the motor in response to a drive signal. The driver means includes commutation means which are responsive to the position signal to energize the motor phases as a function of the rotational position of the output shaft. In a preferred embodiment of the invention, controller means are also included which are responsive to the position signal and to a control signal representative of a predetermined desired position of the output shaft for generating a drive signal to the driver means to cause the motor to rotate the output shaft to the predetermined desired position.

In the preferred embodiment of the invention, the positioning sensor comprises a synchro/resolver constructed of substantially identical components as the motor. The synchro/resolver comprises a stator having a plurality of stator poles, a separate winding for each pole and with certain of the windings being electrically connected in different phases. In the preferred embodiment of the invention, the stator is annularly shaped and the stator poles have a plurality of radially projecting teeth. The synchro/resolver further includes rotor means which are positioned adjacent to the stator poles for changing the inductance of the stator pole windings as a function of the rotational position of the rotor means relative to the stator poles. The rotor and the stator are connected to the motor such that a change in the rotational position of the output shaft of the motor produces a corresponding change in the relative rotational position of the synchro/resolver's rotor. Means are further provided for detecting the change in inductance of each stator coil winding phase relative to each of the other coil winding phases to determine the rotational position of the rotor means, and hence of the output shaft. This means then produces an output signal which is representative of the rotational position of the output shaft of the motor means.

In the preferred embodiment, the detecting means of the synchro/resolver comprises a source of alternating current which is connected to each of the stator coil windings, differential amplifier means for detecting the alternating current flowing through each phase of the coils and for amplifying the differences between the currents in each coil phase, and means for comparing the phase of each of the different currents with the phase of the alternating current source to produce the output signal which is representative of the rotational position of the rotor means, and hence of the output shaft.

The above described servo motor system and improved synchro/resolver enjoy a number of advantages over conventional such devices.

The motor design allows for a linear torque response with respect to the input control signal. Because the motor is unipolar, the power supply and driver circuitry are greatly reduced in complexity, cost, weight and size. Since the synchro/resolver has no slip rings, maintenance problems are reduced and reliability is increased. Also, because the components of the resolver are constructed identical to the corresponding motor components and because the synchro/resolver output is used for commutation, a true proportional commutation will result, irrespective of changes in the motor design from model to model. Furthermore, the synchro/resolver of the present invention is highly accurate.

It is therefore an object of the present invention to have an accurate, high resolution, multiple synchro/resolver that is simple and that requires minimal maintenance.

It is another object of the invention to provide a synchro/resolver and servo motor commutation in which the synchro/resolver controls proportional commutation of the servo motor.

The foregoing and other advantages of the present invention will become apparent to those skilled in the art after having read the following best mode for carrying out the invention, together with the drawings.

BRIEF DESCRIPTION OF THE DRAWINGS

FIG. 1 is a block diagram of a servo motor control system according to the invention;

FIG. 2 is a vertical, sectional view of the motor utilized in the embodiment in FIG. 1;

FIG. 3 is an enlarged, vertical view, taken generally along the line 3—3 in FIG. 2 with portions broken away;

FIG. 4 is an enlarged, vertical sectional view, taken generally along the lines 4—4 in FIG. 2;

FIG. 5 is an enlarged, vertical, sectional view, taken generally along the lines 5—5 in FIG. 2;

FIG. 6 is a schematic diagram of the motor driver circuit depicted in FIG. 1 in block form;

FIG. 7 is a block, schematic diagram of the commutation circuit depicted in FIG. 1;

FIG. 8 is a schematic diagram of the synchro/resolver detecting circuit depicted in FIG. 1; and FIG. 9 is an enlarged, vertical, sectional view, similar to FIG. 5, depicting an alternative synchro/resolver embodiment.

BEST MODE FOR CARRYING OUT THE INVENTION

Referring now more particularly to FIG. 1 of the drawings, an AC synchronous reluctance motor 10 is energized by a power driver unit 12 which is comprised of a power driver board 13 and a commutator board 11. The power driver unit 12, in turn, receives an input signal from a controller/servo board 14 and from the detector 17 of a synchro/resolver 16 connected to the motor. The output of the detector 17 is also supplied, after processing by a synchro to digital converter 74, to the controller/servo board 14 as a feedback signal.

The motor, as better illustrated in FIGS. 2, 3, and 4, is preferably of the type described in the applicant's co-pending application Ser. No. 385,034 entitled High Torque Robot Motor, referred to above, however any salient pole motor, with or without pole piece teeth, will work. The controller/servo board is of a type well known to those skilled in the art and is commercially available, such as the model FPC-1800 from Finell Systems Incorporated, 1190-S Mountain View-Alviso Road, Sunnyvale, Calif. 94086, although other devices have a decoder for receiving the error signal, a microcomputer for receiving an input position control signal which is then compared with the decoded error signal, and a digital to analog converter and reference source for outputting an analog control signal to the servo power driver unit.

Referring now more particularly to FIGS. 2, 3 and 4, the motor 10 is comprised of a cylindrical outer stator assembly 18, a cylindrical inner stator assembly 20, and a cup shaped rotor assembly 22. The rotor assembly 22 is mounted in a bearing mount 24 so that the cylindrical portion of the rotor extends between the inner and the outer stator assemblies 18 and 20, respectively, all of which are arranged coaxially about the axis of rotation of the rotor 22.

As better viewed in FIGS. 3 and 4, the construction of the stator and rotor assemblies will be described in greater detail. The outer stator assembly 18 is comprised of a plurality of annular laminations 26, each of which has a plurality of radially inwardly projecting pole pieces 28 spaced at regular intervals along the inner circumference of the lamination 26. Each pole piece 28 has an electrical coil 32 wound thereon and is provided with a plurality of radially projecting stator pole piece teeth 30.

The inner stator assembly 20 is similarly comprised of a plurality of annular laminations 34, each having a plurality of outwardly radially projecting stator poles 36, arranged at regular intervals around the outer circumferential edge of the laminations 34. Each pole piece 36 has a coil 40 wound thereon and is provided with a plurality of radially extending pole piece teeth 38. The pole pieces 28 and 36 are arranged to be opposite each other along radially extending lines. The windings 32 and 40 are wound and connected together to make up a combined winding such that an electric current flowing through both windings 32 and 40 will produce magnetic poles of opposite polarity at the pole piece teeth 30 and 38 of the opposed stator poles 28 and 36. Furthermore, successive series of the windings 32 and 40 around the circumference of the stator assemblies are connected in phases, for example phases A, B and C of a three phase motor. The current applied to the coils of the next adjacent phase will produce poles of opposite polarity from the preceding phase. The windings of any given phase will hereinafter be referred to collectively by the numeral 35a, 35b or 35c, respectively, for phases A, B or C.

The rotor 22 is comprised of annular laminations 42 which have radially projecting teeth 44 around the outer circumference and radially projecting teeth 46 around the inner circumference. The teeth 44 and 46 are opposed to the teeth 30 and 38.

As shown more clearly in FIG. 4, when the coils 32 surrounding the stator poles of phase B, and every third stator pole thereafter, are energized, a magnetic flux path 48 is generated. This path 48 travels from the inner stator pole 36 of phase B, across that portion of the rotor 22 between the stator poles 28 and 36 of phase B, and through the stator pole 28. The path 48 continues on through the outer stator 18 along its circumference, past two unenergized windings, and back through the outer stator pole 28 of the next succeeding phase B, through the rotor 22, and through the inner stator pole 36 of the next adjacent phase B, to return along the inner stator 20 to the original stator pole 36 of phase B, thereby completing the closed loop.

The important concept is that no flux travels through the rotor in a circumferential direction to take a short cut to the next stator pole. Instead, all of the magnetic flux travels through the rotor 22 in a radially outward or radially inward direction. Furthermore, no flux travels through any unenergized stator poles 28 or 36 of any of the other phases. This design allows the rotor to be much thinner than in previous motors of this type where the magnetic flux had to travel through the rotor to complete the magnetic flux path. Also, because stator poles apply a magnetic force on both the outside and the inside surfaces of the rotor, twice as much torque is generated than in many previous motors of this type.

Six identical flux paths are thus created for a three-phase motor at any one time. This means that a first and every third set of stator coils thereafter is simultaneously energized, and for an eighteen pole motor this means that at any given time, six coil assemblies are simultaneously energized.

The rotative force for the motor is derived from the fact that the teeth on each succeeding stator pole piece set are slightly out of alignment with the opposed teeth of the rotor due to the spacing between the adjacent stator pole pieces. Thus, for example, when the pole pieces of phase B are energized, the teeth 44 and 46 on the rotor which reside between the energized pole pieces will be forced to fall into alignment with the teeth 30 and 38 on the energized stator pole pieces. At this time, the teeth on the portion of the rotor which is positioned between the next adjacent, unenergized pole pieces will not be in alignment with the stator teeth because the pole pieces are spaced apart by a distance which is not an integral multiple of the teeth of spacing. The difference between the number of outer stator teeth and the number of rotor teeth which face the outer stator teeth is equal to the number of outer stator poles divided by the number of phases. This is also true of the rotor teeth which face the inner stator pole piece teeth.

All that is required is that the pitch of the rotor teeth be different from the pitch of the stator teeth. As power is supplied to the coils of each succeeding phase, the rotor will be caused to move to place the rotor teeth into alignment with the stator teeth in each succeeding energized phase and, thus, the rotor will rotate in the same direction in which the power is successively supplied to each of the phases of the motor.

In some cases, for example where a fractional step is required, it is desirable to partially energize more than one phase at a time. Thus, if the coils of phase B are primarily energized and the coils of phase C are partially energized a second magnetic flux path 50 will be generated which passes radially through the adjacent poles 28 and 36 of phases B and C and travels circumferentially through the inner and outer stator assemblies 18 and 20, respectively to return through the phase C stator poles. Again, the coil windings of the adjacent phases are selected such that magnetic poles of opposite polarity will be presented from one phase to the next; the poles 28 of phase B will be of a magnetic south polarity while the poles 28 of phase C will be of a magnetic north polarity, and so forth.

Referring now more particularly to FIGS. 2 and 5, the inner and outer stator assemblies 18 and 20 are supported in a stationary position by a cup shaped support 52 which also supports an outer stator assembly 54 of the synchro/resolver 16. The synchro/resolver 16 is comprised of a plurality of annular shaped laminations 55 each having a plurality of regularly, circumferentially spaced, and radially inwardly projecting stator poles 56. Each stator pole 56 has a separate coil 58 wound thereon and is provided with radially projecting teeth 60. Thus, the construction of the synchro/resolver stator 54 is substantially identical to the outer stator 18. The coils 58 are connected in phases A, B and C to correspond to the phases of the coils of the motor. The rotor 22 extends beyond the stators 18 and 20 and is positioned coaxially interiorly of the outer stator 54 of the synchro/resolver so that the rotor teeth 44 oppose the synchro/resolver stator pole piece teeth 60.

As will be described in greater detail in reference to FIG. 8, the synchro/resolver, instead of producing torque with a change of magnetic reluctance, as is the case in the motor, is supplied with an alternating current in the windings 58 and the change in inductive reactance as the rotor 22 rotates is monitored by the detector circuit 17. When the magnetic teeth 60 and 44 are aligned, the inductance in the energized stator pole piece winding 58 is higher than when the teeth are misaligned. This variation in inductance can be detected by the variation of the alternating current load when driven from a constant alternating current voltage source. This alternating current develops a voltage drop across a current sensing resistor which is in series with each phase. This will now be explained in greater detail.

Referring now more particularly to FIG. 8, the detector circuit 17 comprises a source of alternating current, i.e. an oscillator 62, and is connected at one of its output terminals through resistor 64 to the circuit ground. Each of the windings of a given phase, such as for example all of the windings 56 of phase A, which are designated in the FIG. 8 as 56a, are connected through a current sensing resistor 66a to the circuit ground. Likewise, the one side of the windings 56b of phase B and the windings 56c of phase C are connected through separate current sensing resistors 66b and 66c to the circuit ground. The other ends of the windings 56a, 56b and 56c are connected to the ungrounded terminal of the oscillator 62.

The voltage developed across the current sensing resistor 66a is supplied to the non-inverting input terminal of a differential amplifier 70c and, through an input resistance 68a, to the inverting input terminal of a differential amplifier 70a. The voltage developed across the current sensing resistor 66b is supplied to the non-inverting input terminal of the differential amplifier 70a and, through an input resistance 68b, to the inverting input terminal of a differential amplifier 70b. Correspondingly, the voltage developed across the current sensing resistor 66c is supplied to the non-inverting input terminal of the amplifier 70b and, through an input resistor 68c, to the inverting input terminal of amplifier 70c. Each of the amplifiers 70a, 70b, and 70c has a separate feedback resistance 72a, 72b and 72c, respectively. The outputs of the amplifiers 70a, 70b and 70c are supplied as separate phase inputs to a synchro-to-digital converter module 74. Such devices are well-known in the art and are commercially available. One such device is a Model XDC19109-301 available from ILC Data Device Corporation, 105 Wilbur Place, Bohemia, N.Y. 11716. This device produces a digital synchro position signal as its output.

The digital converter module 74 must also have a reference signal. This is provided by supplying the voltage developed across the resistor 64 through an input resistance 76 to the inverting input terminal of a differential amplifier 78 whose non-inverting input terminal is connected to the circuit ground. A feedback resistance 80 is connected between the output terminal and the inverting input terminal of the amplifier 78. The output terminal of the amplifier 78 is connected to the reference signal input of the digital converter module 74.

The operation of the reactance detection circuit 17 is as follows. Because of leakage inductance in the windings 56a, 56b and 56c, the output signal across the current sensing resistors 66a, 66b and 66c is only modulated about 30 to 40% and must be differentially amplified by amplifiers 72a, 72b and 72c. The difference between the voltages developed across resistors 66a and 66b then becomes the signal, as the leakage inductance reactance common to both phases is now cancelled. Each of the three phases is treated this way by comparing one phase with the next until all three phases are corrected to supply the phase A', phase B' and phase C' outputs. The reference phase is supplied as the output of the amplifier 78 in the form of a current signal to cancel the 90° phase error produced by the current sensing resistors 66a, 66b and 66c of each phase. The phase A', phase B' and phase C' outputs and the reference signal now look like the standard synchro/ resolver output and are compatible with a common synchro/resolver-to-digital converter 74.

The arrangement depicted in FIG. 8 will work with an outside stator only, as illustrated in FIG. 5, an inside stator only, or, for a larger signal and more positional accuracy, with both an inside and an outside stator. Furthermore, the concept applies equally to a two phased resolver, a three phase synchro or a positional transducer with any number of phases.

Referring now more particularly to FIG. 9, an alternative embodiment of the synchro/resolver according to the invention is illustrated. In this embodiment, the resolver has a cylindrical inner stator 100 having a plurality of radially projecting stator pole pieces 102 spaced apart by equal distances about the circumference of the inner stator assembly 100. Each pole piece 102 does not have teeth, however, unlike the stator poles 56 of the embodiment depicted in FIG. 5 or of the stator poles 36 of the motor, as depicted in FIG. 4. A separate coil 104 is wrapped around each stator pole 102. The coils of a number of circumferentially adjacent poles 102 are connected together in a single phase. For an 18 pole, 3-phase motor, the coils of six poles would be connected together. The coils are wound or connected so that when energized, they produce a magnetic flux in the poles which alternates in polarity from one pole to the next.

Coaxially surrounding the inner stator 100 is the rotor 106 which is cylindrically shaped, similar to the rotor 22 of the motor. About the outer periphery of the rotor 106 are a plurality of radially projecting teeth 110. Around the interior surface of the rotor 106, however, there are no teeth. Instead, the internal diameter of the rotor 108 is slightly eccentric. Thus, the air gap which extends between the internal diameter of the rotor 106 and the outer surface of the pole pieces 102 varies in the circumferential direction. More particularly, this air space will vary in distance with respect to any particular pole piece 102 as the rotor 106 is rotated.

Coaxially surrounding the rotor 106 is the outer stator assembly 112 which is also cylindrically shaped and has inwardly, radially projecting pole pieces 114, each of which is equipped with radially projecting pole piece teeth 116 which oppose the teeth 110. Each pole piece 114 has a coil 118 wrapped around it. The coils 118 are connected in phases in the same fashion as the coils 58 in the embodiment of FIG. 5.

In operation, the change in inductance in the outer coils 114 is sensed by the same type of circuit as depicted in FIG. 8. The information thus derived will tell the servo control circuit the position of the rotor within 1/150th of a revolution.

At the same time, each rotation of the rotor 106 will cause one sinusoidal waveform to be generated for each phase A, B and C which waveform will indicate the gross position of the rotor within the entire revolution. The coils 104 are also connected to the same type of detector circuit as depicted in FIG. 8 and the outputs of the detector circuits for both the outer coils and the inner coils are supplied to separate resolver/detectors 74. The digital output of the two resolver/detectors are then supplied to the servo control circuit 14 with the output of the resolver/detector connected to the coils 104 forming the most significant digital bits and the resolver/detector connected to the coils 118 supplying the least significant bits to the servo control circuit 14. This allows absolute positioning detection of the output shaft of the motor which is connected to the rotor 106.

In prior art resolvers, such as those using an optical encoder, it is necessary to provide a reference point by first energizing one phase of the motor in order to align the teeth or poles. Thereafter, when the motor is rotated, the optical encoder supplies a stream of digital pulses representative of how far the motor has revolved from that reference point. Even this approach sometimes fails if the motor is heavily loaded and does not originally achieve its preset starting point. The present invention, however, as depicted in FIG. 5, allows an absolute position over one commutation pitch, and always in the correct phase.

Because of the high resolution of the synchro/resolver according to the invention, velocity information can be obtained even at low speeds.

Further advantages are obtained in using the same design of laminations for the motor and the synchro/resolver and then using the output of the synchro/resolver for proportional commutation. The stator tooth profile of the synchro/resolver will produce a signal current which automatically matches the requirements of the motor for waveform shape, duration and phase. Thus, if the tooth width of the motor is modified or the gap between the rotor or the stator is modified in designing the motor, the synchro/resolver, which is made of identical components, will also be correspondingly modified to produce a commutation signal which operates the motor windings correctly under the new set of design conditions. It is as though the teeth of the motor were commutating themselves as opposed to more mechanical commutation devices such as optical encoders that have no magnetic bearing on the motor requirements.

Referring now more particularly to FIG. 6, the power driver circuit board 13 for the motor will be briefly described. It includes a three phase, unipolar switching regulator amplifier 86 (chopper) which is capable of providing up to 6 amperes continuously and 9 amperes peak per phase. The circuit 13 receives three separate waveforms, phase A, phase B and phase C in the correct relationship for maximum torque. The amplitudes of these waveforms are set by the commanded current input, as will be described in greater detail hereinafter. For the present purpose, it is sufficient to say that in the servo loop configuration of FIG. 1, the commanded current input is the output from the servo amplifier 14 and thus controls the current in the motor to reach equilibrium with the load torque.

The phase A, phase B and phase C signals are pulse width modulated to transmit an analog current level across separate input digital opto-couplers 82a, 82b and 82c, respectively. These opto-couplers provide line isolation as well as grounding protection. The modulation frequency is not critical, but should be somewhere between 10 KHz and 100 KHz. The outputs of the opto-couplers 82a, 82b and 82c are supplied to separate integraters 84a, 84b and 84c, whose outputs are separately connected to the inputs of separate switching amplifiers 86a, 86b and 86c. The outputs of the switching amplifiers 86a, 86b and 86c are, in turn, connected across the separate phase windings 35a, 35b and 35c of the motor 10.

The switching amplifiers 86a, 86b and 86c are comprised of VMOS field effect transistors and fast recovery diodes that are switched at 20 KHz for low acoustical noise. The ripple current in the motor is removed by the current feedback loop in each phase. As the input duty cycle is varied from 0% to 100%, the output to the motor windings will vary linearly from minimum to maximum output current.

Since the motor requires only one polarity, the power driver circuit 12 is supplied with a modified halfwave bridge 88. The power supply 88 is directly line operated using a bridge rectifier and a capacitor filter to provide the required 150 volts. The power supply is transformerless to reduce size, weight and cost, however, an isolation transformer for double isolation can be added. Fault detection circuits 90 monitor the line for under and over voltage conditions as well as exceeding the maximum regeneration absorption of the power driver.

Referring now more particularly to FIG. 7, the commutator circuit board 11 is depicted. The phase signals phase A', phase B' and phase C' supplied from the synchro/resolver depicted in FIG. 8 are input to synchronous detectors 92 which are also supplied with a reference phase input from the oscillator 62. The synchronously detected outputs from the detectors 92 are separately integrated by integrators 94 and are input to a current modulator 96. The purpose of the integrators 94 is to filter the output of the synchronous detector. The current modulator 96 modulates these signals in response to the commanded input signal from the servo control board 14. The separate phase signal outputs from the current modulator 96 are pulse width modulated by separate pulse width modulators 98a, 98b and 98c to produce the pulse width modulated signals which are used to transmit the analog current level to the digital optical couplers 82a, 82b and 82c of the power driver circuit 13.

The commutation board thus provides three functions, driving and detecting the synchro/resolver signals, amplifying the levels to standard levels for the servo loop and controlling the power drive phase inputs to commutate the motor. The 150 output cycles per revolution of the synchro/resolver 16 corresponds to the number of poles of the motor so that it can easily be used for synchronous commutation information, in effect creating a type of brushless DC motor. In this way, the driver circuit 13 receives the three waveforms in correct phase for maximum torque while the amplitude of the waveforms is set by the commanded input current.

Using the synchro/resolver's detected output, the commutation circuit 11 operates the motor's phases sequentially and proportionally with sine weighted currents. As a result, the motor will respond to an analog input signal as in a traditional DC servo system. The sine weighted input, however, can also be done in software, thus eliminating the commutator circuit 11 as well as any digital-to-analog converters. The output register of the servo loop micro processor contained in the servo circuit 14 can be used to command a duty cycle with a few outboard digital "counter/timer" integrated circuits, driving the power driver opto-couplers directly. In that way, the servo loop can be simple, low in cost and all digital.

The actual shape of the waveform supplied to the motor windings 35 should be a clipped or compressed half sine wave for minimum torque ripple. The phase should be advanced or retarded electrically 120° depending on the direction of rotation desired for maximum torque versus current characteristics. If a higher slew speed is required and a reduction of torque is tolerable, then the motor phase energization timing can be further advanced. This modulation of the phase timing is analogous to "field weakening" in DC shunt motors. It effectively reduces the back-EMF of the motor providing higher speed at lower torque.

The terms and expressions which have been employed here are used as terms of description and not of limitations, and there is no intention, in the use of such terms and expressions, of excluding equivalents of the features shown and described, or portions thereof, it being recognized that various modifications are possible within the scope of the invention claimed.

I claim:

1. A position sensing device comprising
   a first stator having a plurality of pole pieces,
   a plurality of first coil windings, each pole piece of the first stator having a single one of the first coil windings wound on it, and with the first coil windings being connected together in a plurality of phases,
   rotor means positioned adjacent the first stator's poles, and movable with respect to them, for changing the inductance of the first coil windings as a function of the position of the rotor means relative to the first stator's poles,
   oscillator means for supplying an alternating current reference signal to the first coil windings,
   first current sensing means for detecting the magnitude of the alternating currents flowing through each phase of the first coil windings,
   first differential means connected to the first current sensing means for determining the differences in the magnitudes of such alternating currents between each phase and for amplifying such differences, and
   first comparing means for comparing the phase of each of the current magnitude differences with the phase of the alternating current reference signal to produce a first output signal which is relative to the first stator.

2. A position sensing device as recited in claim 1 further comprising
   a second stator having a plurality of pole pieces,
   a plurality of second coil windings connected to the oscillator means, each pole piece of the second stator having a single one of the second coil windings wound on it, and wherein the second coil windings on groups of adjacent second stator pole pieces are connected together in phases and the phases of the first coil windings are wound on non-adjacent first stator pole pieces,
   the second stator being positioned relative to the rotor such that relative movement between the rotor and the second stator causes a corresponding change in the inductance of the second coil windings, second current sensing means for detecting the magnitude of the alternating currents flowing through each phase of the second coil windings, second differential means connected to the second current sensing means for determining the differences in the magnitudes of such alternating currents between each phase of the second coil windings and for amplifying such differences, second comparing means for comparing the phase of each of the current magnitude differences with the phase of the alternating current reference signal to produce a second output signal which is representative of the gross position of the rotor relative to the second stator.

3. A position sensing device as recited in claim 2 wherein the first stator's pole pieces each have a plurality of pole piece teeth and the rotor means has a plurality of teeth spaced at the same pitch in correspondence with the first stator's pole piece teeth and opposing them, and wherein the first stator's pole pieces are spaced apart by a distance which is a non-integral multiple of the pitch of the first stator's pole piece teeth, and wherein the second stator's pole pieces and the portion of the rotor opposing them are smooth, the rotor having a protruding portion opposed to the second stator pole pieces, the protruding portion extending over a length corresponding to a distance which is less than the distance occupied by the second stator's pole pieces of any given phase, whereby the first output signal indicates the discrete position of the rotor relative to the first stator's pole pieces within any given phase and the second output signal indicates the gross position of the rotor relative to the second stator's pole piece phases.

4. A position sensing device as recited in claim 1 wherein the first stator's pole pieces each have a plurality of pole piece teeth and the rotor means has a plurality of teeth spaced at the same pitch in correspondence with the first stator's pole piece teeth, and wherein the first stator's poles are spaced apart by a distance which is a non-integral multiple of the pitch of the first stator's teeth.

5. A position sensing device as recited in claim 4 wherein the rotor and the stator of the device are connected, respectively, to a rotor and a stator of a motor of like construction.

6. In combination, a position sensing device as recited in claim 1, a motor connected to drive the rotor means, a driver circuit, responsive to an input signal, for driving the motor, a commutation circuit for correctly phasing the input signal to the driver circuit, the commutation circuit being responsive to a commanded input signal and to the output signal of the detecting means, and controller means responsive in part to the output signal of the comparing means for supplying a commanded input signal to the commutation circuit.

7. The combination as recited in claim 6 wherein the motor is an alternating current, multiphased, synchronous, reluctance motor of the type having an annular stator assembly with circumferentially arranged stator poles and an annular rotor assembly and the positioning sensor is comprised of elements of substantially identical construction as the corresponding elements of the motor's rotor and stator assemblies.

* * * * *